(12) United States Patent
Layouni et al.

(10) Patent No.: US 12,394,251 B2
(45) Date of Patent: Aug. 19, 2025

(54) SYSTEM AND METHOD FOR NOISE LOCALIZATION IN A VEHICLE

(71) Applicant: GM Global Technology Operations LLC, Detroit, MI (US)

(72) Inventors: Mohamed A. Layouni, Fraser, MI (US); Markus Jochim, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 201 days.

(21) Appl. No.: 18/356,441

(22) Filed: Jul. 21, 2023

(65) Prior Publication Data

US 2025/0029429 A1 Jan. 23, 2025

(51) Int. Cl.
*G07C 5/00* (2006.01)
*G07C 5/08* (2006.01)

(52) U.S. Cl.
CPC .......... *G07C 5/006* (2013.01); *G07C 5/0808* (2013.01)

(58) Field of Classification Search
CPC ......... G07C 5/006; G07C 5/0808; G01H 1/00
See application file for complete search history.

(56) References Cited

U.S. PATENT DOCUMENTS

| | | |
|---|---|---|
| 10,580,232 B2 | 3/2020 | Jiang et al. |
| 11,054,339 B2 | 7/2021 | Feng et al. |
| 2019/0108692 A1 | 4/2019 | Du et al. |
| 2024/0177545 A1* | 5/2024 | Bailey .................... H04R 3/005 |

* cited by examiner

*Primary Examiner* — Michael V Kerrigan
(74) *Attorney, Agent, or Firm* — Vivacqua Crane, PLLC

(57) ABSTRACT

A system for noise localization for a vehicle includes a plurality of vehicle sensors. The plurality of vehicle sensors includes at least one of a microphone, a vibration sensor, a vehicle road speed sensor, and a vehicle motor speed sensor. The system also includes a controller in electrical communication with the plurality of vehicle sensors. The controller is programmed to perform a plurality of measurements of a noise produced by a defective part of the vehicle using the plurality of vehicle sensors. The controller is further programmed to determine a location of the defective part within the vehicle based at least in part on the plurality of measurements using at least one of a machine learning based method and an analytical method. The controller is further programmed to identify the defective part of the vehicle based at least in part on the location of the defective part within the vehicle.

14 Claims, 8 Drawing Sheets

SYSTEM AND METHOD FOR NOISE LOCALIZATION IN A VEHICLE

INTRODUCTION

The present disclosure relates to systems and methods for noise localization for a vehicle, and more particularly, to systems and methods for determining a location of a defective part within a vehicle.

To increase occupant awareness and convenience, vehicles may be equipped with on-board diagnostic (OBD) systems which are configured to gather and store data about the operation of vehicle systems for diagnostic purposes. OBD systems may use various sensors and data analysis techniques to gather data about the operation of vehicle systems. The data may include, for example, engine/motor performance, emissions levels, transmission performance, safety system performance, and/or the like. If abnormalities are present in the data, the OBD system may save one or more diagnostic trouble codes (DTCs), and alert vehicle occupants to take the vehicle for service. Service technicians may connect diagnostic equipment to the OBD system to read saved DTCs and further analyze data gathered by the OBD system. However, OBD systems may not account for noise and/or vibration produced by degraded, damaged, and/or defective components of the vehicle. For example, purely mechanical components without any electrical sensors in communication with the OBD system may not be monitored or diagnosed by the OBD system.

Thus, while on-board diagnostic systems and methods achieve their intended purpose, there is a need for a new and improved system and method for determining a location of a defective part within a vehicle.

SUMMARY

According to several aspects, a system for noise localization for a vehicle is provided. The system includes a plurality of vehicle sensors. The plurality of vehicle sensors includes at least one of a microphone, a vibration sensor, a vehicle road speed sensor, and a vehicle motor speed sensor. The system also includes a controller in electrical communication with the plurality of vehicle sensors. The controller is programmed to perform a plurality of measurements of a noise produced by a defective part of the vehicle using the plurality of vehicle sensors. The controller is further programmed to determine a location of the defective part within the vehicle based at least in part on the plurality of measurements using at least one of a machine learning based method and an analytical method. The controller is further programmed to identify the defective part of the vehicle based at least in part on the location of the defective part within the vehicle.

In another aspect of the present disclosure, to determine the location of the defective part within the vehicle using the machine learning based method, the controller is further programmed to input the plurality of measurements into a machine learning algorithm. The machine learning algorithm is configured to receive the plurality of measurements as input and produce a plurality of probabilities as output. Each of the plurality of probabilities corresponds to a probability that noises within the plurality of measurements emanate from a particular location within the vehicle. To determine the location of the defective part within the vehicle using the machine learning based method, the controller is further programmed to determine the location of the defective part within the vehicle based at least in part on the plurality of probabilities.

In another aspect of the present disclosure, the plurality of vehicle sensors includes at least three vibration sensors. Each of the at least three vibration sensors are affixed to a different location in the vehicle. To perform the plurality of measurements, the controller is further programmed to perform a first plurality of vibration measurements with a first vibration sensor of the plurality of vehicle sensors. To perform the plurality of measurements, the controller is further programmed to perform a second plurality of vibration measurements with a second vibration sensor of the plurality of vehicle sensors. To perform the plurality of measurements, the controller is further programmed to perform a third plurality of vibration measurements with a third vibration sensor of the plurality of vehicle sensors.

In another aspect of the present disclosure, to determine the location of the defective part within the vehicle using the analytical method, the controller is further programmed to identify a vibration event based at least in part on the first, second, and third pluralities of vibration measurements. The vibration event emanates from the location of the defective part within the vehicle. The vibration event includes at least three vibration pairs. A first vibration pair is detected in the first plurality of vibration measurements, a second vibration pair is detected in the second plurality of vibration measurements, and a third vibration pair is detected in the third plurality of vibration measurements. Each of the first, second, and third vibration pairs includes a longitudinal vibration and transversal vibration. To determine the location of the defective part within the vehicle using the analytical method, the controller is further programmed to determine a first distance between the first vibration sensor and the defective part based at least in part on a difference between a reception time of the longitudinal vibration of the first vibration pair and a reception time of the transversal vibration of the first vibration pair. To determine the location of the defective part within the vehicle using the analytical method, the controller is further programmed to determine a second distance between the second vibration sensor and the defective part based at least in part on a difference between a reception time of the longitudinal vibration of the second vibration pair and a reception time of the transversal vibration of the second vibration pair. To determine the location of the defective part within the vehicle using the analytical method, the controller is further programmed to determine a third distance between the third vibration sensor and the defective part based at least in part on a difference between a reception time of the longitudinal vibration of the third vibration pair and a reception time of the transversal vibration of the third vibration pair. To determine the location of the defective part within the vehicle using the analytical method, the controller is further programmed to determine the location of the defective part using trilateration based at least in part on the first distance, the second distance, and the third distance.

In another aspect of the present disclosure, to identify the vibration event, the controller is further programmed to perform a spectral analysis to identify a plurality of frequencies present in the first, second, and third pluralities of vibration measurements. To identify the vibration event, the controller is further programmed to compare the plurality of frequencies to a range of normal operation frequencies. To identify the vibration event, the controller is further programmed to identify the vibration event in response to determining that at least one of the plurality of frequencies is outside of the range of normal operation frequencies.

In another aspect of the present disclosure, to identify the vibration event, the controller is further programmed to input the first, second, and third pluralities of vibration measurements to a machine learning algorithm. The machine learning algorithm is configured to use unsupervised learning to separate the first, second, and third pluralities of vibration measurements into a normal measurement subset and an abnormal measurement subset. To identify the vibration event, the controller is further programmed to identify the vibration event based at least in part on the abnormal measurement subset.

In another aspect of the present disclosure, the plurality of vehicle sensors includes at least three microphones. Each of the at least three microphones is affixed to a different location in the vehicle. To perform the plurality of measurements, the controller is further programmed to perform a first plurality of noise measurements with a first microphone of the at least three microphones. To perform the plurality of measurements, the controller is further programmed to perform a second plurality of noise measurements with a second microphone of the at least three microphones. To perform the plurality of measurements, the controller is further programmed to perform a third plurality of noise measurements with a third microphone of the at least three microphones.

In another aspect of the present disclosure, to determine the location of the defective part within the vehicle using the analytical method, the controller is further programmed to identify a noise event based at least in part on the first, second, and third pluralities of noise measurements. The noise event emanates from the location of the defective part within the vehicle. To determine the location of the defective part within the vehicle using the analytical method, the controller is further programmed to determine a first possible location range of the defective part relative to the first of the at least three microphones and the second of the at least three microphones based at least in part on a first phase difference between the first plurality of noise measurements and the second plurality of noise measurements. To determine the location of the defective part within the vehicle using the analytical method, the controller is further programmed to determine a second possible location range of the defective part relative to the first of the at least three microphones and the third of the at least three microphones based at least in part on a second phase difference between the first plurality of noise measurements and the third plurality of noise measurements. To determine the location of the defective part within the vehicle using the analytical method, the controller is further programmed to determine a third possible location range of the defective part relative to the second of the at least three microphones and the third of the at least three microphones based at least in part on a third phase difference between the second plurality of noise measurements and the third plurality of noise measurements. To determine the location of the defective part within the vehicle using the analytical method, the controller is further programmed to determine the location of the defective part based at least in part on the first possible location range, the second possible location range, and the third possible location range.

In another aspect of the present disclosure, the controller is further programmed to scan the location of the defective part for noise produced by the defective part using the beamforming microphone array.

In another aspect of the present disclosure, the controller is further programmed to determine a possible location of the defective part within the vehicle based at least in part on the plurality of measurements using the analytical method. The controller is further programmed to determine the location of the defective part within the vehicle based at least in part on the plurality of measurements and the possible location using the machine learning based method.

According to several aspects, a method for noise localization is provided. The method includes performing a plurality of measurements of a noise produced by a defective part using a plurality of vehicle sensors. The method also includes determining a location of the defective part based at least in part on the plurality of measurements using at least one of a machine learning based method and an analytical method, and identifying the defective part based at least in part on the location of the defective part.

In another aspect of the present disclosure, determining the location of the defective part using the machine learning based method further may include inputting the plurality of measurements into a machine learning algorithm. The machine learning algorithm is configured to receive the plurality of measurements as input and produce a plurality of probabilities as output. Each of the plurality of probabilities corresponds to a probability that noises within the plurality of measurements emanate from a particular location. Determining the location of the defective part using the machine learning based method further may include determining the location of the defective part based at least in part on the plurality of probabilities.

In another aspect of the present disclosure, performing the plurality of measurements further may include performing a first plurality of vibration measurements with a first vibration sensor of the plurality of vehicle sensors. Performing the plurality of measurements further may include performing a second plurality of vibration measurements with a second vibration sensor of the plurality of vehicle sensors. Performing the plurality of measurements further may include performing a third plurality of vibration measurements with a third vibration sensor of the plurality of vehicle sensors.

In another aspect of the present disclosure, determining the location of the defective part using the analytical method further may include identifying a vibration event based at least in part on the first, second, and third pluralities of vibration measurements. The vibration event emanates from the location of the defective part. The vibration event includes at least three vibration pairs. A first vibration pair is detected in the first plurality of vibration measurements, a second vibration pair is detected in the second plurality of vibration measurements, and a third vibration pair is detected in the third plurality of vibration measurements. Each of the first, second, and third vibration pairs includes a longitudinal vibration and transversal vibration. Determining the location of the defective part using the analytical method further may include determining a first distance between the first vibration sensor and the defective part based at least in part on a difference between a reception time of the longitudinal vibration of the first vibration pair and a reception time of the transversal vibration of the first vibration pair. Determining the location of the defective part using the analytical method further may include determining a second distance between the second vibration sensor and the defective part based at least in part on a difference between a reception time of the longitudinal vibration of the second vibration pair and a reception time of the transversal vibration of the second vibration pair. Determining the location of the defective part using the analytical method further may include determining a third distance between the third vibration sensor and the defective part based at least in part on a difference between a reception time of the longitudinal vibration of the third vibration pair and a reception time of the transversal vibration of the third vibration pair. Determining the location of the defective part using the analytical method further may include determining the location of the defective part using trilateration based at least in part on the first distance, the second distance, and the third distance.

In another aspect of the present disclosure, identifying the vibration event further may include performing a spectral analysis to identify a plurality of frequencies present in the first, second, and third pluralities of vibration measurements. Identifying the vibration event further may include comparing the plurality of frequencies to a range of normal operation frequencies. Identifying the vibration event further may include identifying the vibration event in response to determining that at least one of the plurality of frequencies is outside of the range of normal operation frequencies.

In another aspect of the present disclosure, performing the plurality of measurements further may include performing a first plurality of noise measurements with a first microphone of at least three microphones. Performing the plurality of measurements further may include performing a second plurality of noise measurements with a second microphone of the at least three microphones. Performing the plurality of measurements further may include performing a third plurality of noise measurements with a third microphone of the at least three microphones.

In another aspect of the present disclosure, determining the location of the defective part using the analytical method further may include identifying a noise event based at least in part on the first, second, and third pluralities of noise measurements. The noise event emanates from the location of the defective part. Determining the location of the defective part using the analytical method further may include determining a first possible location range of the defective part relative to the first of the at least three microphones and the second of the at least three microphones based at least in part on a first phase difference between the first plurality of noise measurements and the second plurality of noise measurements. Determining the location of the defective part using the analytical method further may include determining a second possible location range of the defective part relative to the first of the at least three microphones and the third of the at least three microphones based at least in part on a second phase difference between the first plurality of noise measurements and the third plurality of noise measurements. Determining the location of the defective part using the analytical method further may include determining a third possible location range of the defective part relative to the second of the at least three microphones and the third of the at least three microphones based at least in part on a third phase difference between the second plurality of noise measurements and the third plurality of noise measurements. Determining the location of the defective part using the analytical method further may include determining the location of the defective part based at least in part on the first possible location range, the second possible location range, and the third possible location range.

According to several aspects, a system for noise localization for a vehicle is provided. The system includes a plurality of vehicle sensors. The plurality of vehicle sensors includes at least three microphones. Each of the at least three microphones is affixed to a different location in the vehicle. The system further includes a controller in electrical communication with the plurality of vehicle sensors. The controller is programmed to perform a plurality of measurements of a noise produced by a defective part of the vehicle using each of the at least three microphones. The controller is further programmed to determine a location of the defective part within the vehicle based at least in part on the plurality of measurements. The controller is further programmed to identify the defective part of the vehicle based at least in part on the location of the defective part within the vehicle.

In another aspect of the present disclosure, to perform the plurality of measurements, the controller is further programmed to perform a first plurality of noise measurements with a first microphone of the at least three microphones. To perform the plurality of measurements, the controller is further programmed to perform a second plurality of noise measurements with a second microphone of the at least three microphones. To perform the plurality of measurements, the controller is further programmed to perform a third plurality of noise measurements with a third microphone of the at least three microphones.

In another aspect of the present disclosure, to determine the location of the defective part within the vehicle, the controller is further programmed to identify a noise event based at least in part on the first, second, and third pluralities of noise measurements. The noise event emanates from the location of the defective part within the vehicle. To determine the location of the defective part within the vehicle, the controller is further programmed to determine a first possible location range of the defective part relative to the first of the at least three microphones and the second of the at least three microphones based at least in part on a first phase difference between the first plurality of noise measurements and the second plurality of noise measurements. To determine the location of the defective part within the vehicle, the controller is further programmed to determine a second possible location range of the defective part relative to the first of the at least three microphones and the third of the at least three microphones based at least in part on a second phase difference between the first plurality of noise measurements and the third plurality of noise measurements. To determine the location of the defective part within the vehicle, the controller is further programmed to determine a third possible location range of the defective part relative to the second of the at least three microphones and the third of the at least three microphones based at least in part on a third phase difference between the second plurality of noise measurements and the third plurality of noise measurements. To determine the location of the defective part within the vehicle, the controller is further programmed to determine the location of the defective part based at least in part on the first possible location range, the second possible location range, and the third possible location range.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Upon degradation, malfunction, and/or failure, electrical and/or mechanical components of vehicles may produce abnormal vibrations and/or noises. Service technicians may evaluate abnormal noises produced by the vehicle as part of a diagnostic process. However, some noises and/or vibrations are imperceptible to the human senses, due to, for example, volume and/or frequency levels. Additionally, locating a defective part which is a source of abnormal noise and/or vibration in a complex vehicle system may be challenging, especially if the abnormal noise and/or vibration is produced predominately when the vehicle is in motion. Accordingly, the present disclosure provides a new and improved system and method to locate a defective part within a vehicle which is producing abnormal noise and/or vibration.

Figure 1:
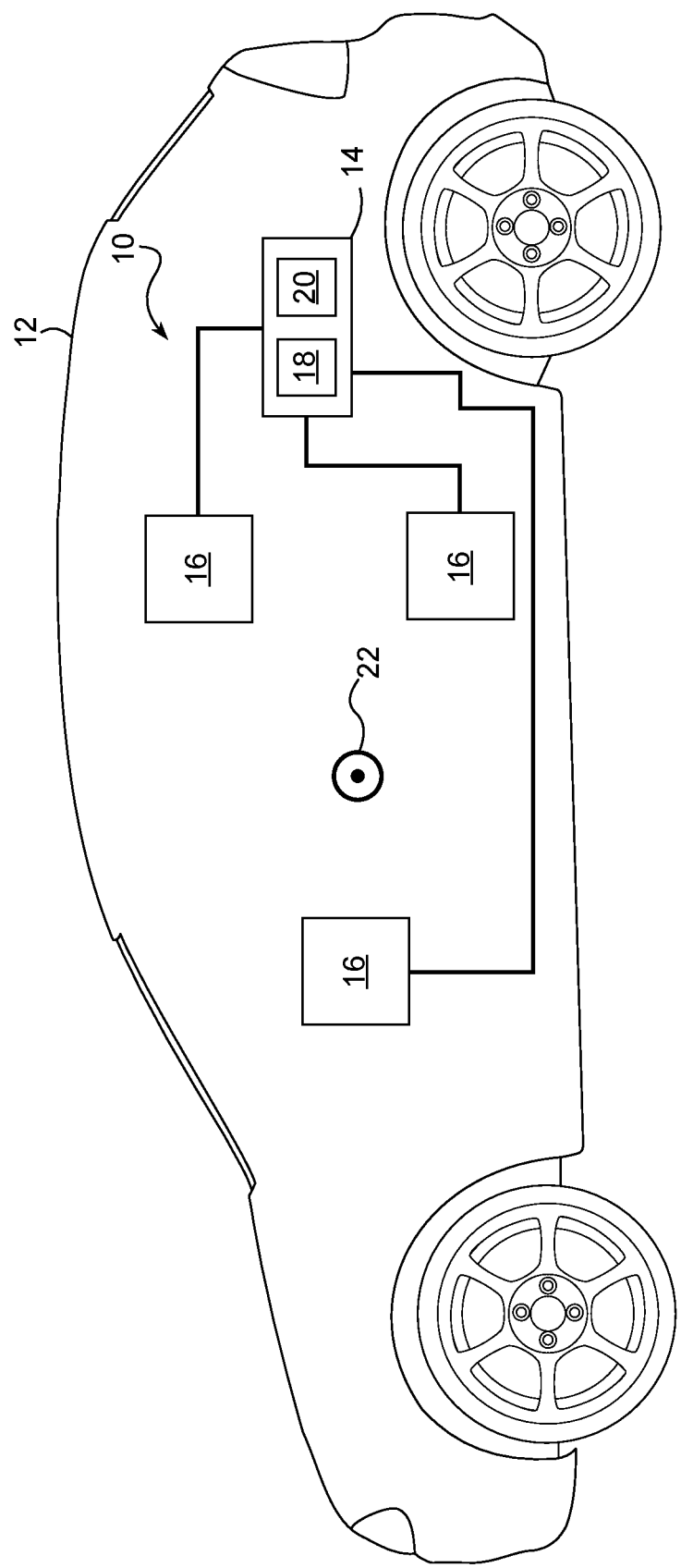
FIG. 1 is a schematic diagram of a system for noise localization for a vehicle, according to an exemplary embodiment.

Referring to FIG. 1, a system for noise localization for a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14 and a plurality of vehicle sensors 16.

The controller 14 is used to implement a method 100 for noise localization, as will be described below. The controller 14 includes at least one processor 18 and a non-transitory computer readable storage device or media 20. The processor 18 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 20 may include volatile and non-volatile storage in read-only memory (ROM), random-access memory (RAM), and keep-alive memory (KAM), for example. KAM is a persistent or non-volatile memory that may be used to store various operating variables while the processor 18 is powered down. The computer-readable storage device or media 20 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the plurality of vehicle sensors 16. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 14 are within the scope of the present disclosure.

The plurality of vehicle sensors 16 are used to detect and measure vibrational and/or sound waves produced by a defective part 22 within the vehicle 12. In the scope of the present disclosure, the defective part 22 is a mechanical and/or electrical component which requires service. The defective part 22 may include, for example, a suspension component (e.g., a tie rod, a shock, a strut, and/or the like), an engine component (e.g., an ignition coil, a crankshaft, a timing chain, and/or the like), a transmission component, an electric drivetrain component (e.g., an electric motor), and/or the like. Due to a deteriorated state of the defective part 22, the defective part 22 may produce noise and/or vibration during operation which may be detected by the plurality of vehicle sensors 16.

Figure 2:
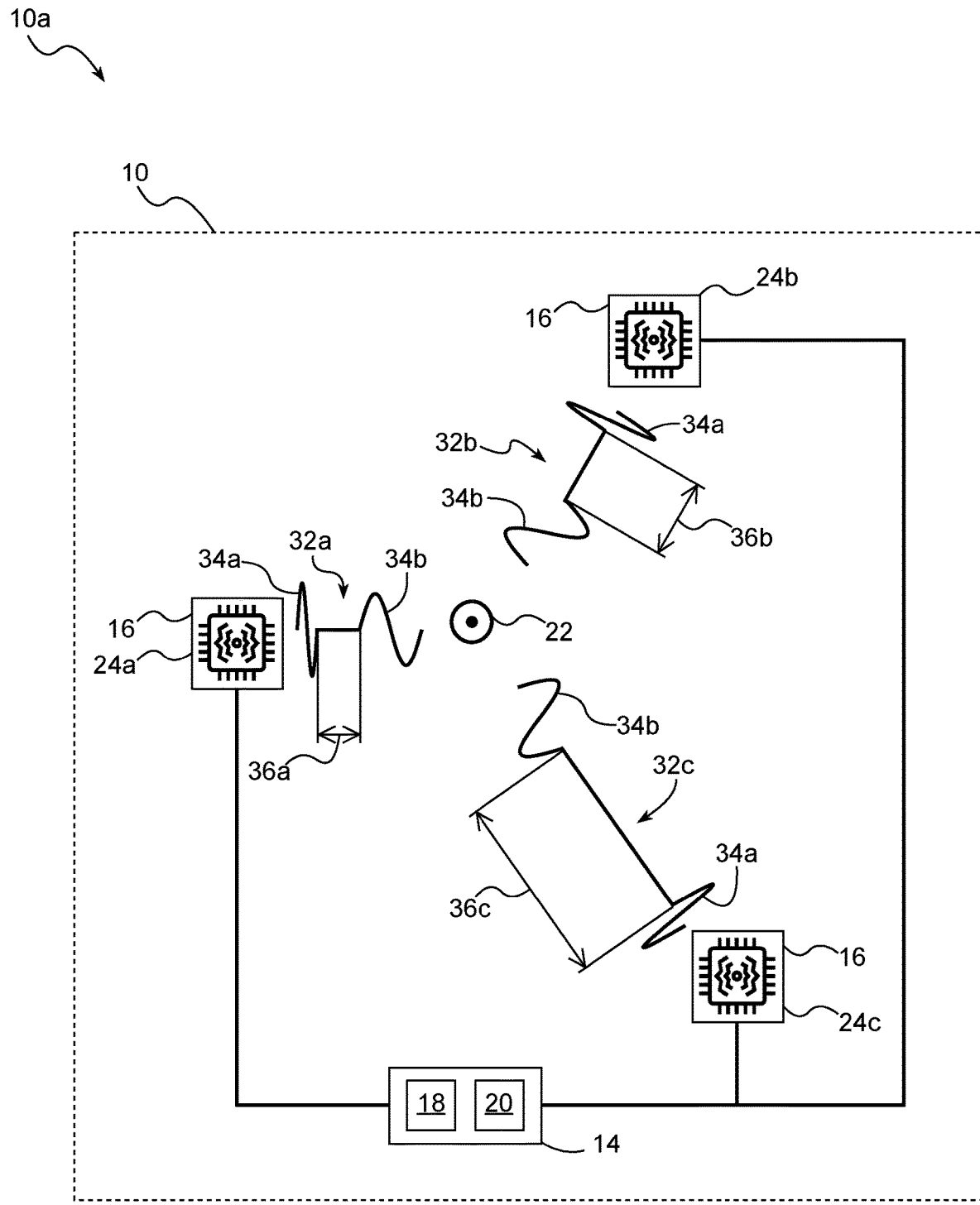
FIG. 2 is a schematic diagram of a first embodiment of the system for noise localization for a vehicle, according to an exemplary embodiment.

Referring to FIG. 2, a first exemplary embodiment 10a of the system 10 is shown. In the first exemplary embodiment 10a, the plurality of vehicle sensors 16 includes at least a first vibration sensor 24a, a second vibration sensor 24b, and a third vibration sensor 24c.

The first vibration sensor 24a, the second vibration sensor 24b, and the third vibration sensor 24c are used to detect vibrations produced by the defective part 22 and transmitted through a structure of the vehicle 12. In an exemplary embodiment, the first vibration sensor 24a, the second vibration sensor 24b, and the third vibration sensor 24c are affixed to different locations within the vehicle 12.

In a non-limiting example, the first vibration sensor 24a is affixed near a front portion of the vehicle 12 (e.g., in an engine bay of the vehicle 12). The second vibration sensor 24b is affixed near a middle of the portion of the vehicle 12 (e.g., on a frame of the vehicle 12 in a passenger compartment of the vehicle 12). The third vibration sensor 24c is affixed near a rear portion of the vehicle 12 (e.g., in a cargo area of the vehicle 12). In an exemplary embodiment, the first vibration sensor 24a, the second vibration sensor 24b, and the third vibration sensor 24c are fixedly bonded to structural components of the vehicle 12 (e.g., a frame of the vehicle 12, a body pillar of the vehicle 12, and/or the like), such that vibrations are effectively transmitted to the first vibration sensor 24a, the second vibration sensor 24b, and the third vibration sensor 24c.

In an exemplary embodiment, the first vibration sensor 24a, the second vibration sensor 24b, and the third vibration sensor 24c can measure and distinguish between transversal vibrations and longitudinal vibrations. In the scope of the present disclosure, transversal vibrations are vibrations which displace particles of a medium transmitting the transversal vibration perpendicular to a direction of travel of the transversal vibration wave in the medium. Longitudinal vibrations are vibrations which displace particles of a medium transmitting the longitudinal vibration parallel to a direction of travel of the longitudinal vibration wave in the medium. Transversal and longitudinal vibrations travel at different speeds. In an exemplary embodiment, the first vibration sensor 24a, the second vibration sensor 24b, and the third vibration sensor 24c are accelerometers. It should be understood that the first vibration sensor 24a, the second vibration sensor 24b, and the third vibration sensor 24c may be any sensors capable of detecting and measuring transversal vibrations and longitudinal vibrations. In some embodiments, the first vibration sensor 24a, the second vibration sensor 24b, and the third vibration sensor 24c may each further include a microphone.

Figure 3:
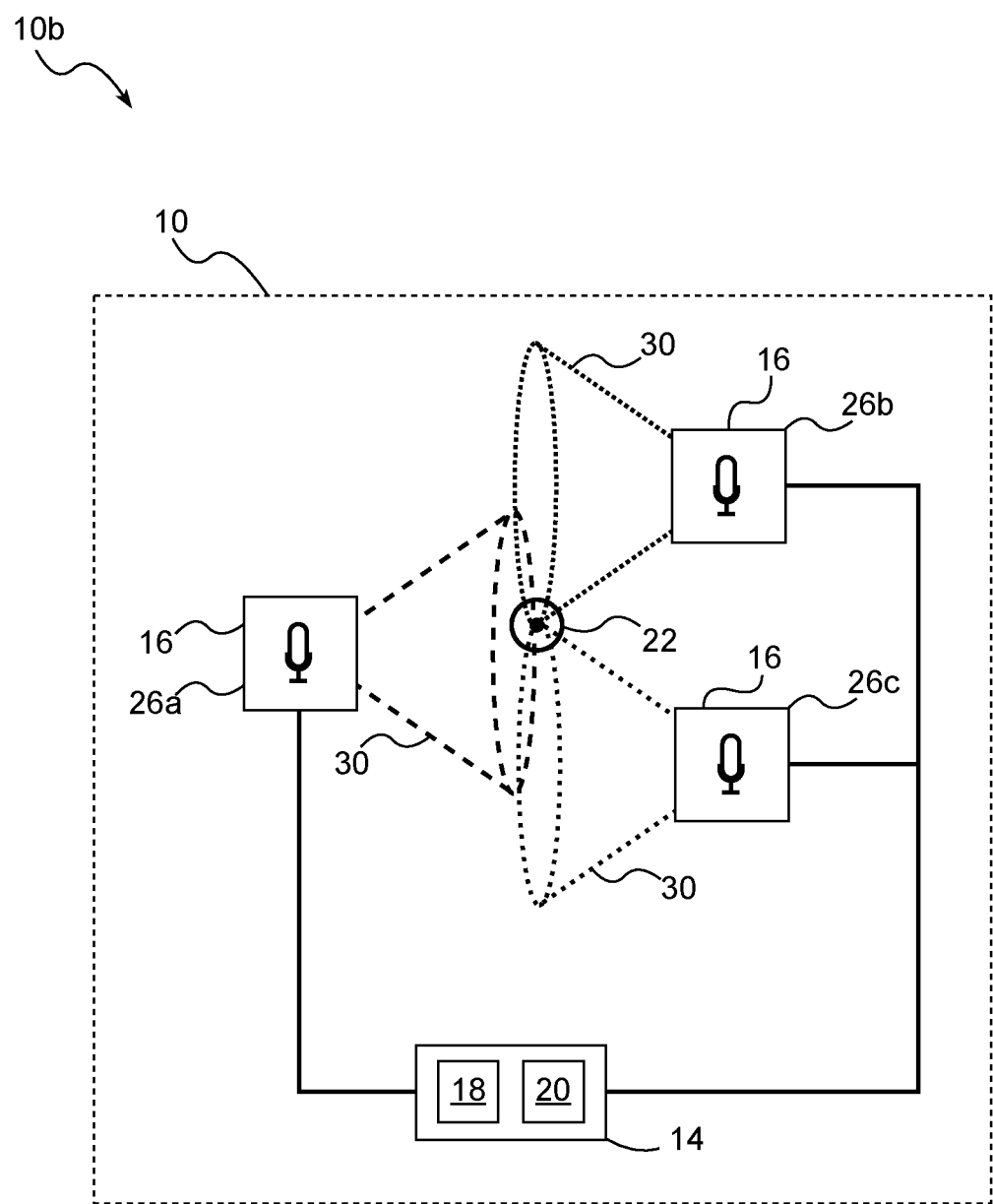
FIG. 3 is a schematic diagram of a second embodiment of the system for noise localization for a vehicle, according to an exemplary embodiment.

Referring to FIG. 3, a second exemplary embodiment 10b of the system 10 is shown. In the second exemplary embodiment 10b, the plurality of vehicle sensors 16 includes at least a first microphone 26a, a second microphone 26b, and a third microphone 26c.

The first microphone 26a, the second microphone 26b, and the third microphone 26c are used to detect noises produced by the defective part 22. In an exemplary embodiment, the first microphone 26a, the second microphone 26b, and the third microphone 26c are affixed to different locations within the vehicle 12.

In a non-limiting example, the first microphone 26a is affixed near a front portion of the vehicle 12 (e.g., in an engine bay of the vehicle 12). The second microphone 26b is affixed near a middle of the portion of the vehicle 12 (e.g., on a frame of the vehicle 12 in a passenger compartment of the vehicle 12). The third microphone 26c is affixed near a rear portion of the vehicle 12 (e.g., in a cargo area of the vehicle 12).

In an exemplary embodiment, each of the first microphone 26a, the second microphone 26b, and the third microphone 26c includes at least one microphone. Based on differences in time of arrival and/or power level of received noises between the first microphone 26a, the second microphone 26b, and the third microphone 26c, a direction of the location of the defective part 22 relative to each of the first microphone 26a, the second microphone 26b, and the third microphone 26c may be determined.

For a given one of the first microphone 26a, the second microphone 26b, and the third microphone 26c, a direction of the location of the defective part 22 may be ambiguous if the defective part 22 is located in a particular region (sometimes referred to as the cone of confusion 30) relative to the given pair of microphones. An axis of the cone of confusion 30 lies along an axis between the pair of microphones. Noises emanating from a location along a circumference of a circular conical slice of the cone of confusion 30 may not be unambiguously located by two microphones in some instances. This is because, for noises emanating from a location along a circumference of a circular conical slice of the cone of confusion 30, there is no difference in time of arrival or power level between signals received by any two of the first microphone 26a, the second microphone 26b, and the third microphone 26c. Therefore, in the second exemplary embodiment 10b, the plurality of vehicle sensors 16 includes three microphones (i.e., the first microphone 26a, the second microphone 26b, and the third microphone 26c) such that the defective part 22 may be accurately located.

In a non-limiting example, the each of the first microphone 26a, the second microphone 26b, and the third microphone 26c includes at least one microelectromechanical systems (MEMS) microphone (e.g., a microphone having a pressure-sensitive diaphragm etched directly into a silicon wafer). It should be understood that additional types of microphones which are configured to convert acoustic waves to electrical signals (e.g., digital and/or analog electrical signals) are included in the scope of the present disclosure.

In an exemplary embodiment, one or more of the first microphone 26a, the second microphone 26b, and the third microphone 26c may include a beamforming microphone array. In the scope of the present disclosure, "beamforming" refers to the process of forming a directional beam of sensitivity toward a desired noise source while suppressing noise and interference from other directions. In a non-limiting example, the beamforming microphone array uses signal processing algorithms to analyze signals received from individual microphones and selectively combine them to create the directional beam of sensitivity. As will be discussed in greater detail below, once a probable location of the defective part 22 has been established, the beamforming microphone array may be used to scan the probable location to confirm and/or increase the accuracy of the determination of the location of the defective part 22.

It should be understood that in both the first exemplary embodiment 10a and the second exemplary embodiment 10b, the plurality of vehicle sensors 16 further includes sensors to determine performance data about the vehicle 12. In an exemplary embodiment, the plurality of vehicle sensors 16 further includes at least one of a motor speed sensor, a motor torque sensor, a road speed sensor, an electric drive motor voltage and/or current sensor, an accelerator pedal position sensor, a coolant temperature sensor, a cooling fan speed sensor, and a transmission oil temperature sensor.

In another exemplary embodiment, the plurality of vehicle sensors 16 further includes sensors to determine information about the environment within the vehicle 12, such as, for example, a seat occupancy sensor, a cabin air temperature sensor, a cabin motion detection sensor, a cabin camera, a cabin microphone, and/or the like.

In another exemplary embodiment, the plurality of vehicle sensors 16 further includes sensors to determine information about the environment surrounding the vehicle 12, for example, an ambient air temperature sensor, a barometric pressure sensor, and/or a photo and/or video camera which is positioned to view an environment in front of the vehicle 12.

Figure 4:
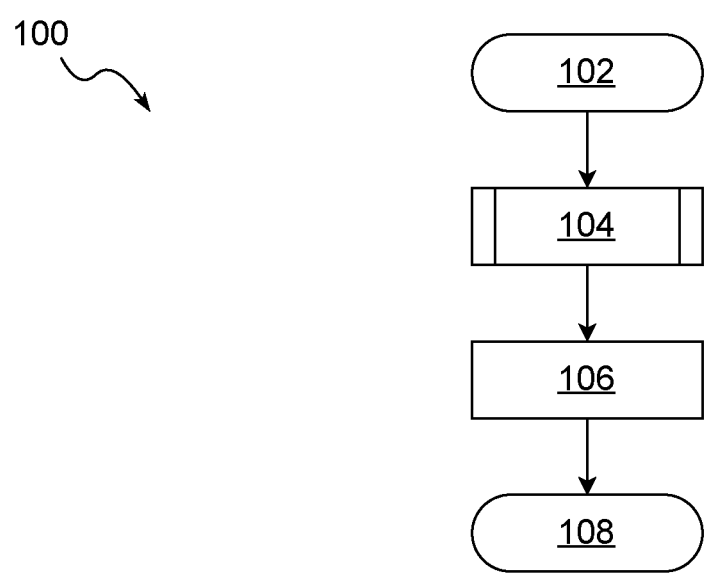
FIG. 4 is a flowchart of a method for noise localization, according to an exemplary embodiment.

Referring to FIG. 4, a flowchart of the method 100 for noise localization is shown. The method 100 begins at block 102 and proceeds to block 104. At block 104, the controller 14 performs a plurality of measurements using the plurality of vehicle sensors 16 and determines a location of the defective part 22, as will be discussed in greater detail below. After block 104, the method 100 proceeds to block 106.

At block 106, the controller 14 identifies the defective part 22 based at least in part on the location of the defective part 22 determined at block 104. In an exemplary embodiment, the controller 14 uses a lookup table (LUT) stored in the media 20 of the controller 14 to identify the defective part 22. The LUT has a key column (i.e., a key column for the location of the defective part 22) and one value column (i.e., a name of the defective part 22, a part number of the defective part 22, and/or the like). In an exemplary embodiment, the LUT includes a plurality of rows, each of the plurality of rows mapping a unique location in the key column to a value in the value column (i.e., the identity of the defective part 22). The LUT is stored in the media 20 of the controller 14. In an exemplary embodiment, the plurality of rows of the LUT are predetermined. In another exemplary embodiment, the plurality of rows of the LUT may be modified by the occupant, using, for example, a human-interface device. In yet another exemplary embodiment, the plurality of rows of the LUT may be updated over-the-air (OTA). It should be understood that any method (e.g., programmatic data structure, logic equation, mathematical function, and/or the like) of mapping a key to a value is within the scope of the present disclosure.

In an exemplary embodiment, after identifying the defective part 22, the controller 14 may take an action based at least in part on the identification of the defective part 22. In an exemplary embodiment, the controller 14 provides a notification to an occupant of the vehicle 12, using, for example, an infotainment system or other display of the vehicle 12. In another exemplary embodiment, the controller 14 transmits information about the identity of the defective part 22 to an external system, for example, to a diagnostic computer device operated by a service technician and in electrical communication with the controller 14. In another exemplary embodiment, the controller 14 saves a diagnostic trouble code (DTC) in the media 20 and/or in an onboard diagnostic module of the vehicle 12. After block 106, the method 100 proceeds to block 108.

At block 108, the method 100 proceeds to enter a standby state. In an exemplary embodiment, the controller 14 repeatedly exits the standby state 108 and restarts the method 100 at block 102. In a non-limiting example, the controller 14 exits the standby state 108 and restarts the method 100 on a timer, for example, every three hundred milliseconds.

Figure 5:
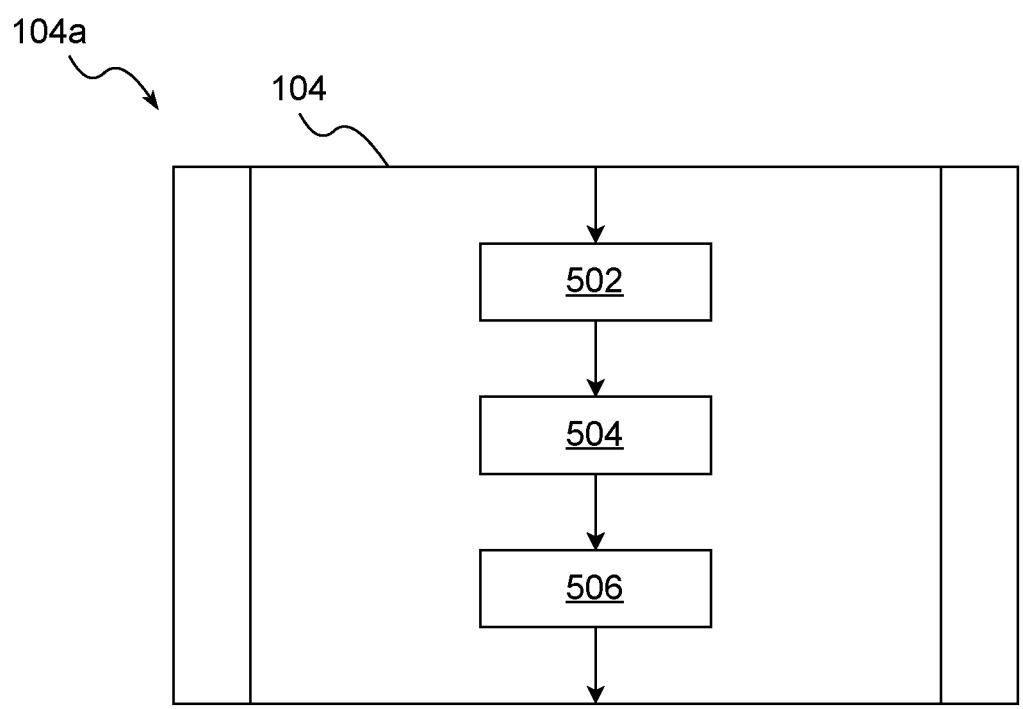
FIG. 5 is a flowchart of a first embodiment of a method for determining a location of a defective part, according to an exemplary embodiment.

Referring to FIG. 5, a flowchart of a first exemplary embodiment 104a of block 104 is shown. The first exemplary embodiment 104a of block 104 may be used with either embodiment 10a or embodiment 10b of the system 10, or a combination of embodiments 10a and 10b. The first exemplary embodiment 104a of block 104 is also referred to as a machine learning based method for determining the location of the defective part 22. The first exemplary embodiment 104a of block 104 begins at block 502. At block 502, the controller 14 performs a plurality of measurements using the plurality of vehicle sensors 16. In an exemplary embodiment, the plurality of measurements includes one or more of: noise measurements, vibration measurements, performance data, environmental data, and/or the like. In a non-limiting example, the plurality of measurements further includes data stored in the media 20 of the controller 14, such as, for example, vehicle service history data. After block 502, the first exemplary embodiment 104a of block 104 proceeds to block 504.

At block 504, the controller 14 inputs the plurality of measurements acquired at block 502 into a machine learning algorithm. In an exemplary embodiment, the machine learning algorithm is configured to receive the plurality of measurements as input and produce a plurality of probabilities as output. Each of the plurality of probabilities corresponds to a probability that noises detected within the plurality of measurements emanate from a particular location within the vehicle (i.e., the location of the defective part 22). In a non-limiting example, the machine learning algorithm includes multiple layers, including an input layer and an output layer, as well as one or more hidden layers. The input layer receives the plurality of measurements acquired at block 502 as inputs. The inputs are then passed on to the hidden layers. Each hidden layer applies a transformation (e.g., a non-linear transformation) to the data and passes the result to the next hidden layer until the final hidden layer. The output layer produces the plurality of probabilities.

To train the machine learning algorithm, a dataset of inputs and the corresponding locations of defective parts is used. The algorithm is trained by adjusting internal weights between nodes in each hidden layer to minimize prediction error. During training, an optimization technique (e.g., gradient descent) is used to adjust the internal weights to reduce the prediction error. The training process is repeated with the entire dataset until the prediction error is minimized, and the resulting trained model is then used to classify new input data.

After sufficient training of the machine learning algorithm, the algorithm is capable of accurately and precisely determining the plurality of probabilities based on the plurality of measurements acquired at block 502. By adjusting the weights between the nodes in each hidden layer during training, the algorithm "learns" to recognize patterns in the data that are indicative of various locations of a defective part 22 within the vehicle 12. After block 504, the first exemplary embodiment 104a of block 104 proceeds to block 506.

At block 506, the controller 14 determines the location of the defective part 22 within the vehicle 12 based at least in part on the plurality of probabilities determined at block 504. In an exemplary embodiment, the location of the defective part 22 is determined to be the location corresponding to the highest probability of the plurality of probabilities determined at block 504. After block 506, the first exemplary embodiment 104a of block 104 is concluded, and the method 100 proceeds as discussed above.

Figure 6:
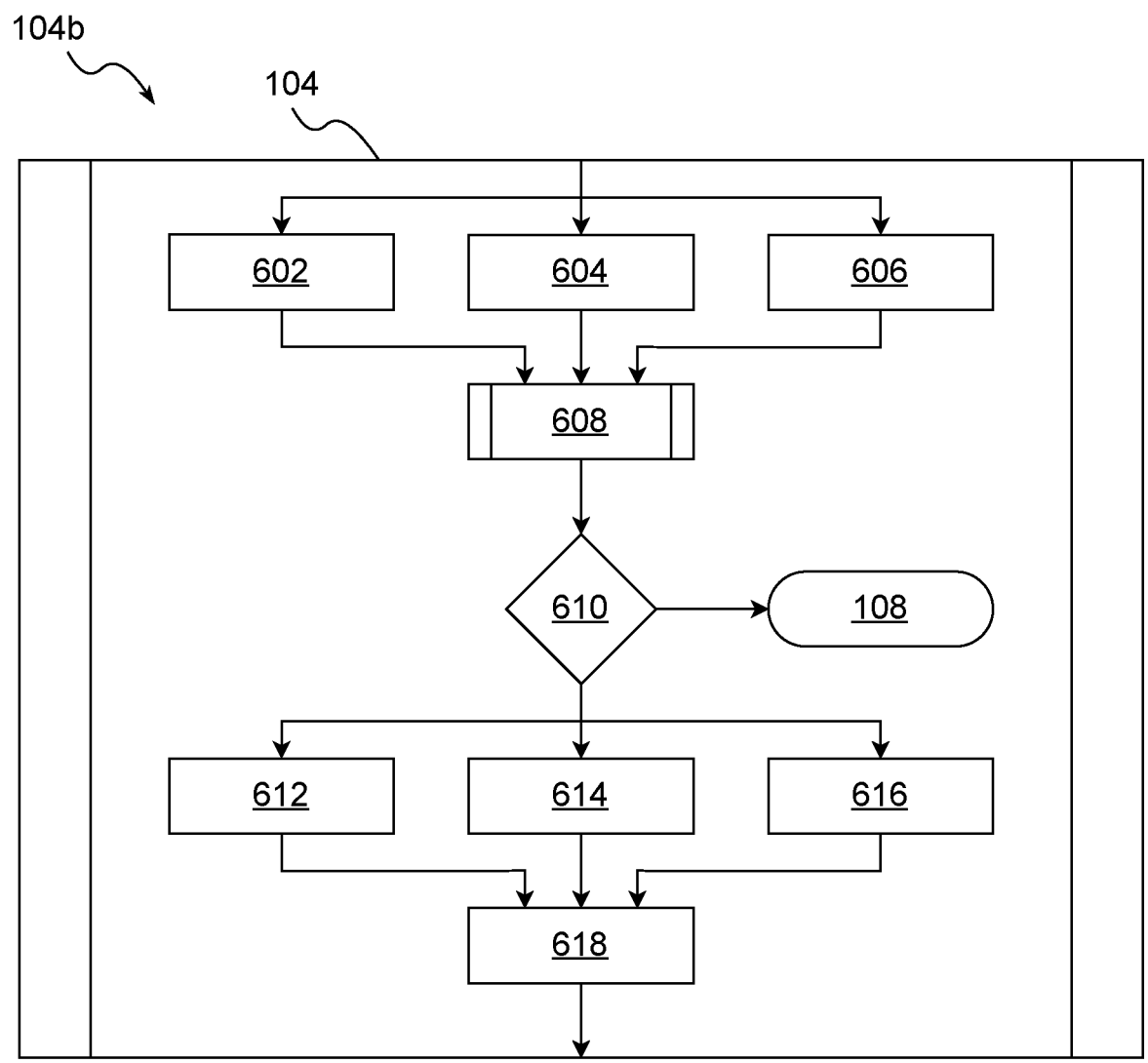
FIG. 6 is a flowchart of a second embodiment of a method for determining a location of a defective part, according to an exemplary embodiment.

Referring to FIG. 6, a flowchart of a second exemplary embodiment 104b of block 104 is shown. The second exemplary embodiment 104b of block 104 is used with embodiment 10a of the system 10. The second exemplary embodiment 104b of block 104 is also referred to as a first analytical method for determining the location of the defective part 22. The second exemplary embodiment 104b of block 104 begins at blocks 602, 604, and 606. At blocks 602, 604, and 606, the controller 14 performs the plurality of measurements.

At block 602, the controller 14 performs a first plurality of vibration measurements using the first vibration sensor 24a. In an exemplary embodiment, the first plurality of vibration measurements includes continuously recording vibration data at a predetermined frequency (e.g., one hundred hertz) for a predetermined time period (e.g., five seconds). After block 602, the second exemplary embodiment 104b of block 104 proceeds to block 608, as will be discussed in greater detail below.

At block 604, the controller 14 performs a second plurality of vibration measurements using the second vibration sensor 24b. In an exemplary embodiment, the second plurality of vibration measurements includes continuously recording vibration data at a predetermined frequency (e.g., one hundred hertz) for a predetermined time period (e.g., five seconds). After block 604, the second exemplary embodiment 104b of block 104 proceeds to block 608, as will be discussed in greater detail below.

At block 606, the controller 14 performs a third plurality of vibration measurements using the third vibration sensor 24c. In an exemplary embodiment, the third plurality of vibration measurements includes continuously recording vibration data at a predetermined frequency (e.g., one hundred hertz) for a predetermined time period (e.g., five seconds). After block 606, the second exemplary embodiment 104b of block 104 proceeds to block 608.

At block 608, the controller 14 identifies a vibration event based at least in part on the first plurality of vibration measurements, the second plurality of vibration measurements, and the third plurality of vibration measurements performed at blocks 602, 604, and 606. Referring to FIG. 2 with continued reference to FIG. 6, in an exemplary embodiment, the vibration event includes at least a first vibration pair 32a, a second vibration pair 32b, and a third vibration pair 32c (i.e., at least three vibration pairs 32a, 32b, 32c). The first vibration pair 32a is detected in the first plurality of vibration measurements (i.e., the first vibration pair 32a is detected by the first vibration sensor 24a). The second vibration pair 32b is detected in the second plurality of vibration measurements (i.e., the second vibration pair 32b is detected by the second vibration sensor 24b). The third vibration pair 32c is detected in the third plurality of vibration measurements (i.e., the third vibration pair 32c is detected by the third vibration sensor 24c). Each of the first vibration pair 32a, the second vibration pair 32b, and the third vibration pair 32c includes a longitudinal vibration 34a and a transversal vibration 34b. It should be understood that while the first vibration pair 32a, the second vibration pair 32b, and the third vibration pair 32c are depicted as individual waves, the first vibration pair 32a, the second vibration pair 32b, and the third vibration pair 32c may also be part of a wavefront radiating radially outward from the defective part 22. Identification of the vibration event will be discussed in greater detail below. After block 608, the second exemplary embodiment 104b of block 104 proceeds to block 610.

At block 610, if the vibration event was not identified at block 608, the second exemplary embodiment 104b of block 104 proceeds to enter the standby state at block 108. If the vibration event was identified at block 608, the second exemplary embodiment 104b of block 104 proceeds to blocks 612, 614, and 616.

At block 612, the controller 14 determines a first distance between the first vibration sensor 24a and the defective part 22. Referring to FIG. 2 with continued reference to FIG. 6, in an exemplary embodiment, to determine the first distance, the controller 14 determines a first difference 36a between a reception time of the longitudinal vibration 34a of the first vibration pair 32a and a reception time of the transversal vibration 34b of the first vibration pair 32a based at least in part on the first plurality of vibration measurements performed at block 602. As discussed above, the longitudinal vibration 34a and the transversal vibration 34b propagate at different speeds through the structure of the vehicle 12. Therefore, the first difference 36a is positively correlated with the first distance (e.g., the first difference 36a may be proportional to the first distance). After block 612, the second exemplary embodiment 104b of block 104 proceeds to block 618, as will be discussed in greater detail below.

At block 614, the controller 14 determines a second distance between the second vibration sensor 24b and the defective part 22. Referring to FIG. 2 with continued reference to FIG. 6, in an exemplary embodiment, to determine the second distance, the controller 14 determines a second difference 36b between a reception time of the longitudinal vibration 34a of the second vibration pair 32b and a reception time of the transversal vibration 34b of the second vibration pair 32b based at least in part on the second plurality of vibration measurements performed at block 604. As discussed above, the longitudinal vibration 34a and the transversal vibration 34b propagate at different speeds through the structure of the vehicle 12. Therefore, the second difference 36b is positively correlated with the second distance (e.g., the second difference 36b may be proportional to the second distance). After block 614, the second exemplary embodiment 104b of block 104 proceeds to block 618, as will be discussed in greater detail below.

At block 616, the controller 14 determines a third distance between the third vibration sensor 24c and the defective part 22. Referring to FIG. 2 with continued reference to FIG. 6, in an exemplary embodiment, to determine the third distance, the controller 14 determines a third difference 36c between a reception time of the longitudinal vibration 34a of the third vibration pair 32c and a reception time of the transversal vibration 34b of the third vibration pair 32c based at least in part on the third plurality of vibration measurements performed at block 606. As discussed above, the longitudinal vibration 34a and the transversal vibration 34b propagate at different speeds through the structure of the vehicle 12. Therefore, the third difference 36c is positively correlated with the third distance (e.g., the third difference 36c may be proportional to the third distance). After block 616, the second exemplary embodiment 104b proceeds to block 618.

At block 618, the controller 14 determines the location of the defective part 22. In an exemplary embodiment, to determine the location of the defective part 22, the controller 14 uses trilateration based on the first distance determined at block 612, the second distance determined at block 614, and the third distance determined at block 616. In the scope of the present disclosure, trilateration is a mathematical technique used to determine the position of an object based on distance measurements between the object and three known reference points. In a non-limiting example, the process of trilateration involves determining the intersection point of three spheres. A first sphere is centered at the location of the first vibration sensor 24a and has a radius equal to the first distance. A second sphere is centered at the location of the second vibration sensor 24b and has a radius equal to the second distance. A third sphere is centered at the location of the third vibration sensor 24c and has a radius equal to the third distance. After block 618, the second exemplary embodiment 104b of block 104 is concluded, and the method 100 proceeds as discussed above.

Figure 7:
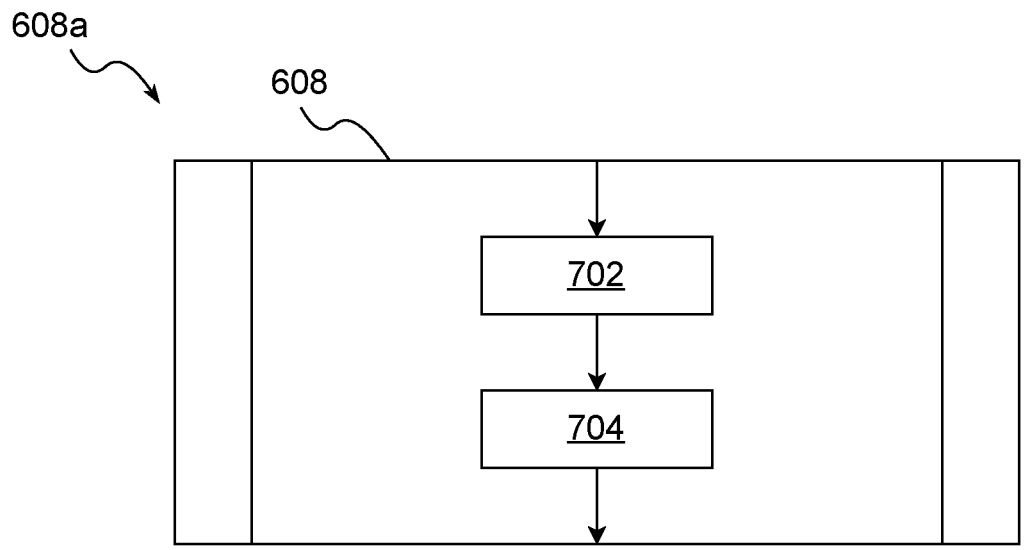
FIG. 7 is a flowchart of a first embodiment of a method for identifying a vibration event, according to an exemplary embodiment.

Referring to FIG. 7, a flowchart of a first exemplary embodiment 608a of block 608 for identifying the vibration event is provided. The first exemplary embodiment 608a of block 608 begins at block 702. At block 702, the controller 14 performs a spectral analysis of the first plurality of vibration measurements performed at block 602, the second plurality of vibration measurements performed at block 604, and the third plurality of vibration measurements performed at block 606. In an exemplary embodiment, the spectral analysis includes identifying a plurality of frequencies present in the first, second, and third pluralities of vibration measurements. In a non-limiting example, the spectral analysis further includes identifying an intensity of each of the plurality of frequencies present in the first, second, and third pluralities of vibration measurements. In a non-limiting example, the spectral analysis is performed using a Fourier transform (e.g., using a fast Fourier transform algorithm). After block 702, the first exemplary embodiment 608a of block 608 proceeds to block 704.

At block 704, the controller 14 compares the plurality of frequencies identified at block 702 to a range of normal operation frequencies. In the scope of the present disclosure, the range of normal operation frequencies includes vibration frequencies which are produced during normal operation of the vehicle 12 (e.g., normal vibration produced by an internal combustion engine of the vehicle 12). In an exemplary embodiment, the range of normal vibration frequencies is stored in the media 20 of the controller 14. Therefore, if one or more of the plurality of frequencies identified at block 702 is outside of the range of normal operation frequencies, the vibration event is determined to be identified at block 610, as discussed above. After block 704, the first exemplary embodiment 608a of block 608 is concluded, and the second exemplary embodiment 104b of block 104 proceeds as described above.

Figure 8:
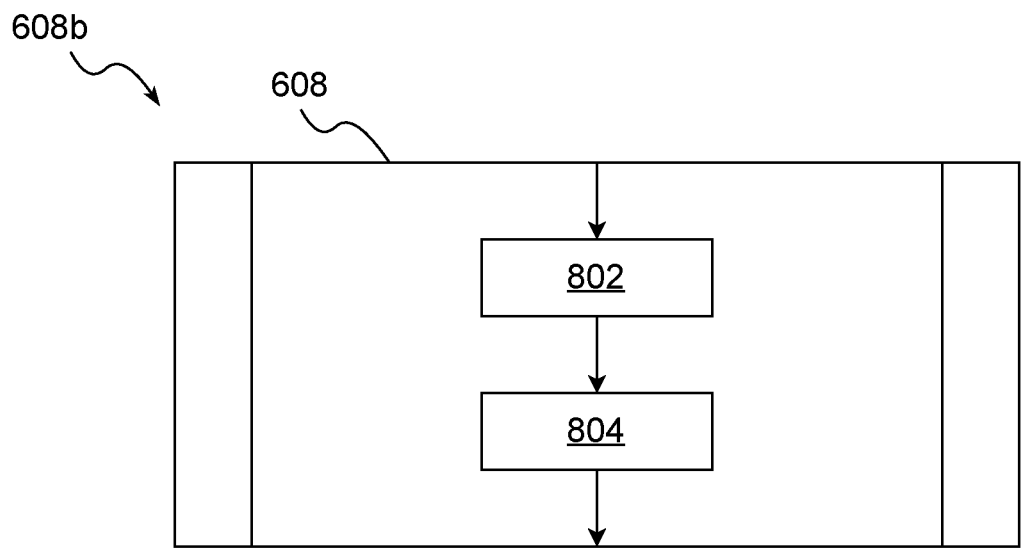
FIG. 8 is a flowchart of a second embodiment of a method for identifying a vibration event, according to an exemplary embodiment.

Referring to FIG. 8, a flowchart of a second exemplary embodiment 608b of block 608 for identifying the vibration event is provided. The second exemplary embodiment 608b of block 608 begins at block 802. At block 802, the controller 14 inputs the first plurality of vibration measurements performed at block 602, the second plurality of vibration measurements performed at block 604, and the third plurality of vibration measurements performed at block 606 into a machine learning algorithm. In an exemplary embodiment, the machine learning algorithm is configured to use unsupervised learning to separate the vibration measurements of the first, second, and third pluralities of vibration measurements into a normal measurement subset and an abnormal measurement subset. In a non-limiting example, unsupervised learning is used to analyze the first, second, and third pluralities of vibration measurements and identify patterns and/or trends. The normal measurement subset includes vibrations caused by normal operation of the vehicle 12. The abnormal measurement subset includes vibrations caused by the defective parts (e.g., the defective part 22). Therefore, if one or more of the vibration measurements of the first, second, and third pluralities of vibration measurements is categorized in the abnormal measurement subset, the vibration event is determined to be identified at block 610, as discussed above. After block 804, the second exemplary embodiment 608b of block 608 is concluded, and the second exemplary embodiment 104b of block 104 proceeds as described above.

Figure 9:
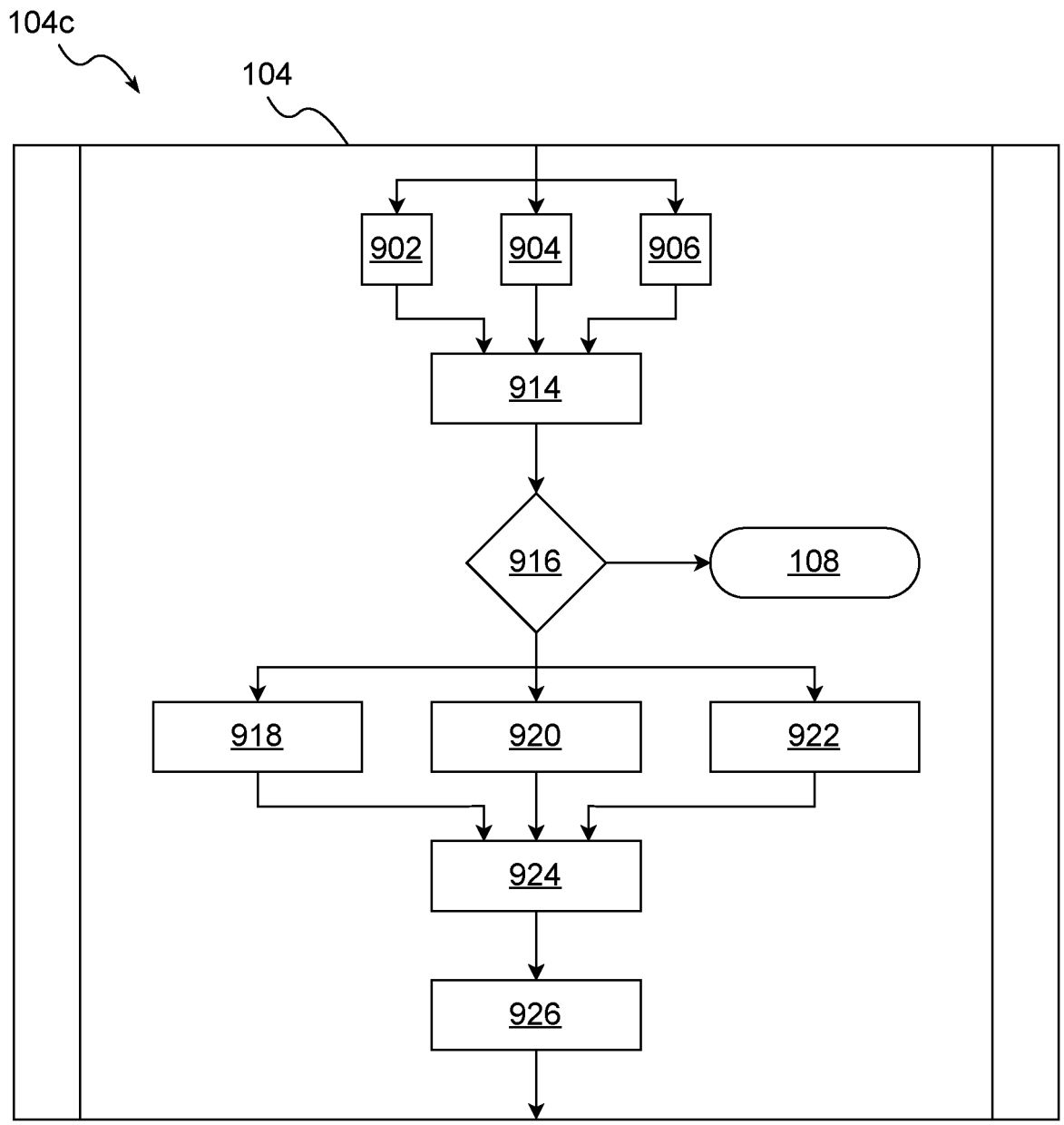
FIG. 9 is a flowchart of a third embodiment of a method for determining a location of a defective part, according to an exemplary embodiment.

Referring to FIG. 9, a flowchart of a third exemplary embodiment 104c of block 104 is shown. The third exemplary embodiment 104c is used with embodiment 10b of the system 10. The third exemplary embodiment 104c of block 104 is also referred to as a second analytical method for determining the location of the defective part 22. The third exemplary embodiment 104c begins at blocks 902, 904, and 906. At blocks 902, 904, and 906, the controller 14 performs the plurality of measurements. At block 902, the controller 14 performs a first plurality of noise measurements using the first microphone 26a. After block 902, the third exemplary embodiment 104c of block 104 proceeds to block 914, as will be discussed in greater detail below.

At block 904, the controller 14 performs a second plurality of noise measurements using the second microphone 26b. After block 904, the third exemplary embodiment 104c of block 104 proceeds to block 914, as will be discussed in greater detail below. At block 906, the controller 14 performs a third plurality of noise measurements using the third microphone 26c. After block 906, the third exemplary embodiment 104c of block 104 proceeds to block 914, as will be discussed in greater detail below.

At block 914, the controller 14 identifies a noise event based at least in part on the first plurality of noise measurements determined at block 902, the second plurality of noise measurements determined at block 904, and the third plurality of noise measurements determined at block 906. In an exemplary embodiment, to identify the noise event, the controller 14 first performs a spectral analysis of the first, second, and third pluralities of noise measurements. In an exemplary embodiment, the spectral analysis includes identifying a plurality of noise frequencies present in the first, second, and third, pluralities of noise measurements. Then, the controller 14 compares the plurality of noise frequencies to a range of normal operation noise frequencies. If one or more of the plurality of noise frequencies is outside of the range of normal operation frequencies, the noise event is determined to be identified. After block 914, the third exemplary embodiment 104c of block 104 proceeds to block 916.

At block 916, if the noise event was not identified at block 914, the third exemplary embodiment 104c of block 104 proceeds to enter the standby state at block 108. If the noise event was identified at block 914 (e.g., if one or more of the plurality of noise frequencies is outside of the range of normal operation frequencies), the third exemplary embodiment 104c of block 104 proceeds to blocks 918, 920, and 922.

At block 918, the controller 14 identifies a first possible location range of the defective part 22 relative to the first microphone 26a and the second microphone 26b. In an exemplary embodiment, the first possible location range is determined based at least in part on a first phase difference between the first plurality of noise measurements performed at block 902 and the second plurality of noise measurements performed at block 904. The first phase difference quantifies a difference in time of arrival of received noises, as discussed above. Furthermore, as discussed above, the first possible location range may include a range of possible locations if the defective part 22 is located on the cone of confusion 30 of the first microphone 26a and/or the second microphone 26b. Therefore, the first possible location range may be represented by a three-dimensional cone shape. In some cases, if the defective part 22 is located outside of the cone of confusion 30, the first possible location range may contain only one possible location. After block 918, the third exemplary embodiment 104c of block 104 proceeds to block 924, as will be discussed in greater detail below.

At block 920, the controller 14 identifies a second possible location range of the defective part 22 relative to the first microphone 26a and the third microphone 26c. In an exemplary embodiment, the second possible location range is determined based at least in part on a second phase difference between the first plurality of noise measurements performed at block 902 and the third plurality of noise measurements performed at block 906. The second phase difference quantifies a difference in time of arrival of received noises, as discussed above. Furthermore, as discussed above, the second possible location range may include a range of possible locations if the defective part 22 is located on the cone of confusion 30 of the first microphone 26a and/or the third microphone 26c. Therefore, the second possible location range may be represented by a three-dimensional cone shape. In some cases, if the defective part 22 is located outside of the cone of confusion 30, the second possible location range may contain only one possible location. After block 920, the third exemplary embodiment 104c of block 104 proceeds to block 924, as will be discussed in greater detail below.

At block 922, the controller 14 identifies a third possible location range of the defective part 22 relative to the second microphone 26b and the third microphone 26c. In an exemplary embodiment, the third possible location range is determined based at least in part on a third phase difference between the second plurality of noise measurements performed at block 904 and the third plurality of noise measurements performed at block 906. The third phase difference quantifies a difference in time of arrival of received noises, as discussed above. Furthermore, as discussed above, the third possible location range may include a range of possible locations if the defective part 22 is located on the cone of confusion 30 of the second microphone 26*b* and/or the third microphone 26*c*. Therefore, the third possible location range may be represented by a three-dimensional cone shape. In some cases, if the defective part 22 is located outside of the cone of confusion 30, the third possible location range may contain only one possible location. After block 922, the third exemplary embodiment 104*c* of block 104 proceeds to block 924.

At block 924, the controller 14 determines the location of the defective part 22 based at least in part on the first possible location range determined at block 918, the second possible location range determined at block 920, and third possible location range determined at block 922. In an exemplary embodiment, to determine the location of the defective part 22, the controller 14 determines an intersection of a first three-dimensional cone which represents the first possible location range determined at block 918, a second three-dimensional cone which represents the second possible location range determined at block 920, and a third three-dimensional cone which represents the third possible location range determined at block 922. The location of the defective part 22 is determined to be at the intersection of the first three-dimensional cone, the second three-dimensional cone, and the third three-dimensional cone. After block 924, the third exemplary embodiment 104*c* of block 104 proceeds to block 926.

At block 926, the controller 14 scans the location determined at block 924 using one or more of the first microphone 26*a*, the second microphone 26*b*, and the third microphone 26*c* configured as a beamforming microphone array. In another embodiment, the controller 14 scans one of the first three-dimensional cone, the second three-dimensional cone, and the third three-dimensional cone. Therefore, a more localized and isolated noise measurement may be performed, allowing confirmation of the location of the defective part 22 and further analysis of the defective part 22, including information such as, for example, a nature and/or severity of the defect. After block 926, the third exemplary embodiment 104*c* of block 104 is concluded, and the method 100 proceeds as discussed above.

It should be understood that the first exemplary embodiment 104*a* of block 104, the second exemplary embodiment 104*b* of block 104, and the third exemplary embodiment 104*c* of block 104 may be used in conjunction, for example, in series, in parallel, and/or in other combination, without departing from the scope of the present disclosure. In a non-limiting example, a possible location of the defective part 22 is determined using the second exemplary embodiment 104*b* of block 104 and/or the third exemplary embodiment 104*c* of block 104 (i.e., using an analytical method). The possible location is then used as an input to the first exemplary embodiment 104*a* of block 104 (i.e., as one of the plurality of measurements discussed in reference to block 502). Subsequently, the first exemplary embodiment 104*a* of block 104 is used to determine the location of the defective part 22 based at least in part on the possible location determined using the second exemplary embodiment 104*b* of block 104 and/or the third exemplary embodiment 104*c* of block 104 (i.e., using an analytical method) and the plurality of measurements performed at block 502.

The system 10 and method 100 of the present disclosure offer several advantages. By continuously and/or repeatedly executing the method 100, defective parts may be identified in the vehicle 12 in a timely manner, allowing for prompt service and repair. Additionally, the plurality of vehicle sensors 16 may be used to identify and diagnose parts nearing failure based on subtle vibrational and/or noise signals. The system 10 and method 100 improve vehicle reliability, reduce service cost/time, and increase occupant convenience.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for noise localization for a vehicle, the system comprising:
a plurality of vehicle sensors, wherein the plurality of vehicle sensors includes at least one of: a microphone, at least three vibration sensors, a vehicle road speed sensor, and a vehicle motor speed sensor, wherein each of the at least three vibration sensors is affixed to a different location in the vehicle; and
a controller in electrical communication with the plurality of vehicle sensors, wherein the controller is programmed to:
perform a plurality of measurements of a noise produced by a defective part of the vehicle using the plurality of vehicle sensors, wherein to perform the plurality of measurements, the controller is further programmed to:
perform a first plurality of vibration measurements with a first vibration sensor of the plurality of vehicle sensors;
perform a second plurality of vibration measurements with a second vibration sensor of the plurality of vehicle sensors; and
perform a third plurality of vibration measurements with a third vibration sensor of the plurality of vehicle sensors;
determine a location of the defective part within the vehicle based at least in part on the plurality of measurements using at least one of: a machine learning based method and an analytical method, wherein to determine the location of the defective part within the vehicle using the analytical method, the controller is further programmed to:
identify a vibration event based at least in part on the first, second, and third pluralities of vibration measurements, wherein the vibration event emanates from the location of the defective part within the vehicle, wherein the vibration event includes at least three vibration pairs, wherein a first vibration pair is detected in the first plurality of vibration measurements, a second vibration pair is detected in the second plurality of vibration measurements, and a third vibration pair is detected in the third plurality of vibration measurements, and wherein each of the first, second, and third vibration pairs includes a longitudinal vibration and transversal vibration, and wherein to identify the vibration event, the controller is further programmed to:

perform a spectral analysis to identify a plurality of frequencies present in the first, second, and third pluralities of vibration measurements;

compare the plurality of frequencies to a range of normal operation frequencies; and identify the vibration event in response to determining that at least one of the plurality of frequencies is outside of the range of normal operation frequencies;

determine a first distance between the first vibration sensor and the defective part based at least in part on a difference between a reception time of the longitudinal vibration of the first vibration pair and a reception time of the transversal vibration of the first vibration pair;

determine a second distance between the second vibration sensor and the defective part based at least in part on a difference between a reception time of the longitudinal vibration of the second vibration pair and a reception time of the transversal vibration of the second vibration pair;

determine a third distance between the third vibration sensor and the defective part based at least in part on a difference between a reception time of the longitudinal vibration of the third vibration pair and a reception time of the transversal vibration of the third vibration pair; and determine the location of the defective part using trilateration based at least in part on the first distance, the second distance, and the third distance; and identify the defective part of the vehicle based at least in part on the location of the defective part within the vehicle.

2. The system of claim 1, wherein to determine the location of the defective part within the vehicle using the machine learning based method, the controller is further programmed to:

input the plurality of measurements into a machine learning algorithm, wherein the machine learning algorithm is configured to receive the plurality of measurements as input and produce a plurality of probabilities as output, and wherein each of the plurality of probabilities corresponds to a probability that noises within the plurality of measurements emanate from a particular location within the vehicle; and determine the location of the defective part within the vehicle based at least in part on the plurality of probabilities.

3. The system of claim 1, wherein to identify the vibration event, the controller is further programmed to:

input the first, second, and third pluralities of vibration measurements to a machine learning algorithm, wherein the machine learning algorithm is configured to use unsupervised learning to separate the first, second, and third pluralities of vibration measurements into a normal measurement subset and an abnormal measurement subset; and identify the vibration event based at least in part on the abnormal measurement subset.

4. The system of claim 1, wherein the plurality of vehicle sensors includes at least three microphones, wherein each of the at least three microphones is affixed to a different location in the vehicle, and wherein to perform the plurality of measurements, the controller is further programmed to:

perform a first plurality of noise measurements with a first microphone of the at least three microphones;

perform a second plurality of noise measurements with a second microphone of the at least three microphones; and perform a third plurality of noise measurements with a third microphone of the at least three microphones.

5. The system of claim 4, wherein to determine the location of the defective part within the vehicle using the analytical method, the controller is further programmed to:

identify a noise event based at least in part on the first, second, and third pluralities of noise measurements, wherein the noise event emanates from the location of the defective part within the vehicle;

determine a first possible location range of the defective part relative to the first microphone of the at least three microphones and the second microphone of the at least three microphones based at least in part on a first phase difference between the first plurality of noise measurements and the second plurality of noise measurements;

determine a second possible location range of the defective part relative to the first microphone of the at least three microphones and the third microphone of the at least three microphones based at least in part on a second phase difference between the first plurality of noise measurements and the third plurality of noise measurements;

determine a third possible location range of the defective part relative to the second microphone of the at least three microphones and the third microphone of the at least three microphones based at least in part on a third phase difference between the second plurality of noise measurements and the third plurality of noise measurements; and determine the location of the defective part based at least in part on the first possible location range, the second possible location range, and the third possible location range.

6. The system of claim 5, further comprising a beamforming microphone array, wherein the controller is further programmed to:

scan the location of the defective part for noise produced by the defective part using the beamforming microphone array.

7. The system of claim 1, wherein the controller is further programmed to:

determine a possible location of the defective part within the vehicle based at least in part on the plurality of measurements using the analytical method; and determine the location of the defective part within the vehicle based at least in part on the plurality of measurements and the possible location using the machine learning based method.

8. A method for noise localization, the method comprising:

performing a plurality of measurements of a noise produced by a defective part using a plurality of vehicle sensors, wherein performing the plurality of measurements further comprises:

performing a first plurality of vibration measurements with a first vibration sensor of the plurality of vehicle sensors;

performing a second plurality of vibration measurements with a second vibration sensor of the plurality of vehicle sensors; and performing a third plurality of vibration measurements with a third vibration sensor of the plurality of vehicle sensors;

determining a location of the defective part based at least in part on the plurality of measurements using at least one of: a machine learning based method and an analytical method, wherein determining the location of the defective part using the analytical method further comprises:
  identifying a vibration event based at least in part on the first, second, and third pluralities of vibration measurements, wherein the vibration event emanates from the location of the defective part, wherein the vibration event includes at least three vibration pairs, wherein a first vibration pair is detected in the first plurality of vibration measurements, a second vibration pair is detected in the second plurality of vibration measurements, and a third vibration pair is detected in the third plurality of vibration measurements, and wherein each of the first, second, and third vibration pairs includes a longitudinal vibration and transversal vibration, and wherein identifying the vibration event further comprises:
    performing a spectral analysis to identify a plurality of frequencies present in the first, second, and third pluralities of vibration measurements;
    comparing the plurality of frequencies to a range of normal operation frequencies; and
    identifying the vibration event in response to determining that at least one of the plurality of frequencies is outside of the range of normal operation frequencies;
  determining a first distance between the first vibration sensor and the defective part based at least in part on a difference between a reception time of the longitudinal vibration of the first vibration pair and a reception time of the transversal vibration of the first vibration pair;
  determining a second distance between the second vibration sensor and the defective part based at least in part on a difference between a reception time of the longitudinal vibration of the second vibration pair and a reception time of the transversal vibration of the second vibration pair;
  determining a third distance between the third vibration sensor and the defective part based at least in part on a difference between a reception time of the longitudinal vibration of the third vibration pair and a reception time of the transversal vibration of the third vibration pair; and
  determining the location of the defective part using trilateration based at least in part on the first distance, the second distance, and the third distance; and
identifying the defective part based at least in part on the location of the defective part.

9. The method of claim 8, wherein determining the location of the defective part using the machine learning based method further comprises:
  inputting the plurality of measurements into a machine learning algorithm, wherein the machine learning algorithm is configured to receive the plurality of measurements as input and produce a plurality of probabilities as output, and wherein each of the plurality of probabilities corresponds to a probability that noises within the plurality of measurements emanate from a particular location; and
  determining the location of the defective part based at least in part on the plurality of probabilities.

10. The method of claim 8, wherein performing the plurality of measurements further comprises:
  performing a first plurality of noise measurements with a first microphone of at least three microphones;
  performing a second plurality of noise measurements with a second microphone of the at least three microphones; and
  performing a third plurality of noise measurements with a third microphone of the at least three microphones.

11. The method of claim 10, wherein determining the location of the defective part using the analytical method further comprises:
  identifying a noise event based at least in part on the first, second, and third pluralities of noise measurements, wherein the noise event emanates from the location of the defective part;
  determining a first possible location range of the defective part relative to the first microphone of the at least three microphones and the second microphone of the at least three microphones based at least in part on a first phase difference between the first plurality of noise measurements and the second plurality of noise measurements;
  determining a second possible location range of the defective part relative to the first microphone of the at least three microphones and the third microphone of the at least three microphones based at least in part on a second phase difference between the first plurality of noise measurements and the third plurality of noise measurements;
  determining a third possible location range of the defective part relative to the second microphone of the at least three microphones and the third microphone of the at least three microphones based at least in part on a third phase difference between the second plurality of noise measurements and the third plurality of noise measurements; and
  determining the location of the defective part based at least in part on the first possible location range, the second possible location range, and the third possible location range.

12. A system for noise localization for a vehicle, the system comprising:
  a plurality of vehicle sensors, wherein the plurality of vehicle sensors includes at least three vibration sensors, wherein each of the at least three vibration sensors is affixed to a different location in the vehicle; and
  a controller in electrical communication with the plurality of vehicle sensors, wherein the controller is programmed to:
    perform a plurality of measurements of a noise produced by a defective part of the vehicle using each of the at least three vibration sensors, wherein to perform the plurality of measurements, the controller is further programmed to:
      perform a first plurality of vibration measurements with a first vibration sensor of the plurality of vehicle sensors;
      perform a second plurality of vibration measurements with a second vibration sensor of the plurality of vehicle sensors; and
      perform a third plurality of vibration measurements with a third vibration sensor of the plurality of vehicle sensors;
    determine a location of the defective part within the vehicle based at least in part on the plurality of measurements, wherein to determine the location of the defective part within the vehicle, the controller is further programmed to:

identify a vibration event based at least in part on the first, second, and third pluralities of vibration measurements, wherein the vibration event emanates from the location of the defective part within the vehicle, wherein the vibration event includes at least three vibration pairs, wherein a first vibration pair is detected in the first plurality of vibration measurements, a second vibration pair is detected in the second plurality of vibration measurements, and a third vibration pair is detected in the third plurality of vibration measurements, and wherein each of the first, second, and third vibration pairs includes a longitudinal vibration and transversal vibration, and wherein to identify the vibration event, the controller is further programmed to:

perform a spectral analysis to identify a plurality of frequencies present in the first, second, and third pluralities of vibration measurements;

compare the plurality of frequencies to a range of normal operation frequencies; and identify the vibration event in response to determining that at least one of the plurality of frequencies is outside of the range of normal operation frequencies;

determine a first distance between the first vibration sensor and the defective part based at least in part on a difference between a reception time of the longitudinal vibration of the first vibration pair and a reception time of the transversal vibration of the first vibration pair;

determine a second distance between the second vibration sensor and the defective part based at least in part on a difference between a reception time of the longitudinal vibration of the second vibration pair and a reception time of the transversal vibration of the second vibration pair;

determine a third distance between the third vibration sensor and the defective part based at least in part on a difference between a reception time of the longitudinal vibration of the third vibration pair and a reception time of the transversal vibration of the third vibration pair; and determine the location of the defective part using trilateration based at least in part on the first distance, the second distance, and the third distance; and identify the defective part of the vehicle based at least in part on the location of the defective part within the vehicle.

13. The system of claim 12, wherein to identify the vibration event, the controller is further programmed to:

input the first, second, and third pluralities of vibration measurements to a machine learning algorithm, wherein the machine learning algorithm is configured to use unsupervised learning to separate the first, second, and third pluralities of vibration measurements into a normal measurement subset and an abnormal measurement subset; and identify the vibration event based at least in part on the abnormal measurement subset.

14. The system of claim 13, further comprising a beamforming microphone array, wherein the controller is further programmed to:

scan the location of the defective part for noise produced by the defective part using the beamforming microphone array.

* * * * *